Sept. 19, 1944.  V. G. KLEIN  2,358,719
INJECTOR VALVE PACKING
Filed Dec. 24, 1942  2 Sheets-Sheet 1

Victor G. Klein,
Inventor.
Haynes and Koenig
Attorneys.

Sept. 19, 1944.    V. G. KLEIN    2,358,719
INJECTOR VALVE PACKING
Filed Dec. 24, 1942    2 Sheets-Sheet 2
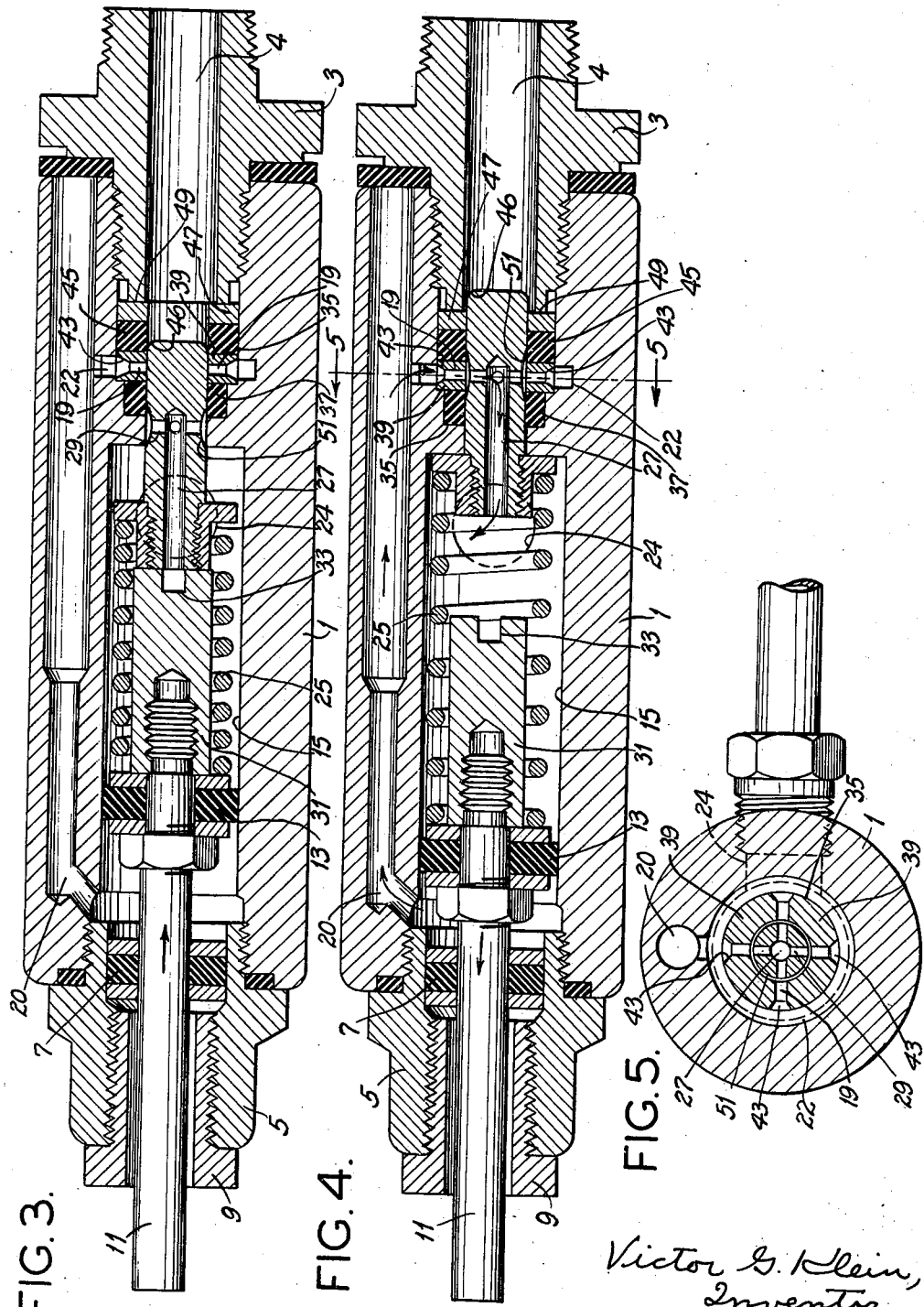

Patented Sept. 19, 1944

2,358,719

UNITED STATES PATENT OFFICE 2,358,719

INJECTOR VALVE PACKING

Victor G. Klein, St. Louis, Mo., assignor to Lincoln Engineering Company, St. Louis, Mo., a corporation of Missouri Application December 24, 1942, Serial No. 470,017

6 Claims. (Cl. 251—76)

This invention relates to packing, and with regard to certain more specific features, to injector valve packing means.

Among the several objects of the invention may be noted the provision of a new packing means for lubricant injector valves and the like which will avoid the excessive cost of lap fits and at the same time increase the life of the injector valve which it serves; and the provision of apparatus of the class described which is easier to make and which is readily renewable in service. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which is illustrated one of various possible embodiments of the invention, Fig. 1 is a longitudinal section of an injector valve assembly showing my new invention as its valve approaches opening position;

Fig. 3 is a view similar to Fig. 2, but showing a subsequent closed position of the valve;

Fig. 4 is a view similar to Fig. 3, showing a subsequent refilling position; and, Fig. 5 is a vertical section taken on line 5—5 of Fig. 4.

Similar reference characters indicate corresponding parts throughout the several views of the drawings.

The present construction constitutes an improvement upon the construction shown in Klein et al. Patent 2,283,638, dated May 19, 1942.

Figure 1:
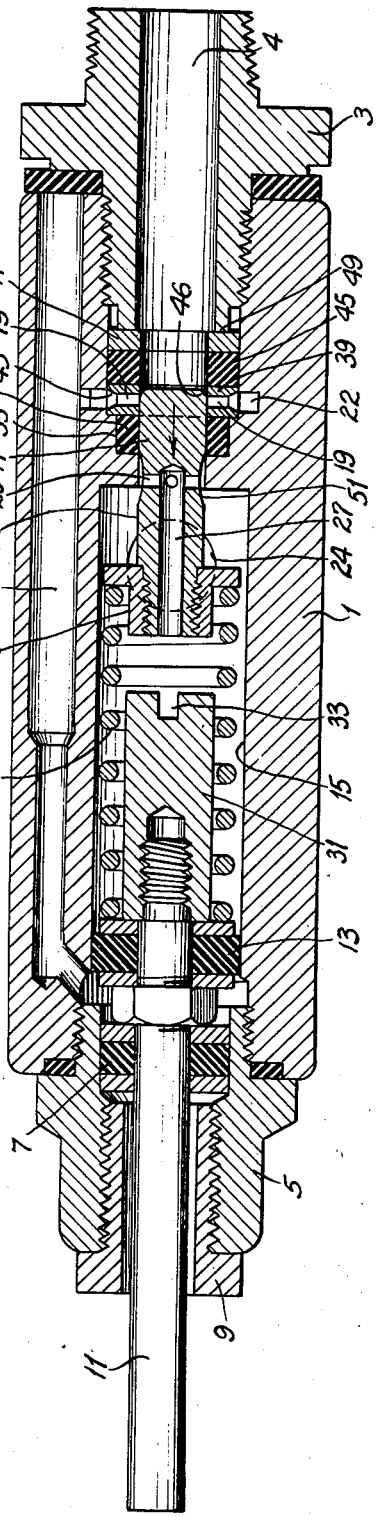

Referring now more particularly to Fig. 1, there is shown at numeral 1 a hollow injector body on one end of which is screwed an inlet bushing 3 having an inlet opening 4 for receiving lubricant under pressure from a supply line. At the other end is a nipple 5 which contains a packing member 7 and a guide bushing 9 for a tell-tale pin 11. This pin 11 is attached to a piston 13 which slides in a measuring chamber 15 in the body 1. The chamber 15 has an outlet 24.

At numeral 17 is shown a new form of slide valve which operates across valve ports 19, the latter being located in a new packing arrangement to be described. Before describing the new arrangements, the description of the apparatus in broad outlines will be completed in order to make clear the problem involved and its solution.

The slide valve 17, by means of a hollow extension 21, reaches into the measuring chamber 15 where it is provided with a spring seat 23 for a spring 25 reacting from a piston 13. The hollow portion of the extension 21 is indicated as a bore 27, from which extend radial passages or ports 29. The valve has a stream-lined or hourglass waist 51 at the belt surrounding the ports 29.

A by-pass 20 including an annulus 22 reaches from ports 19 to the space in chamber 15 behind (to the left of) piston 13.

Figure 2:
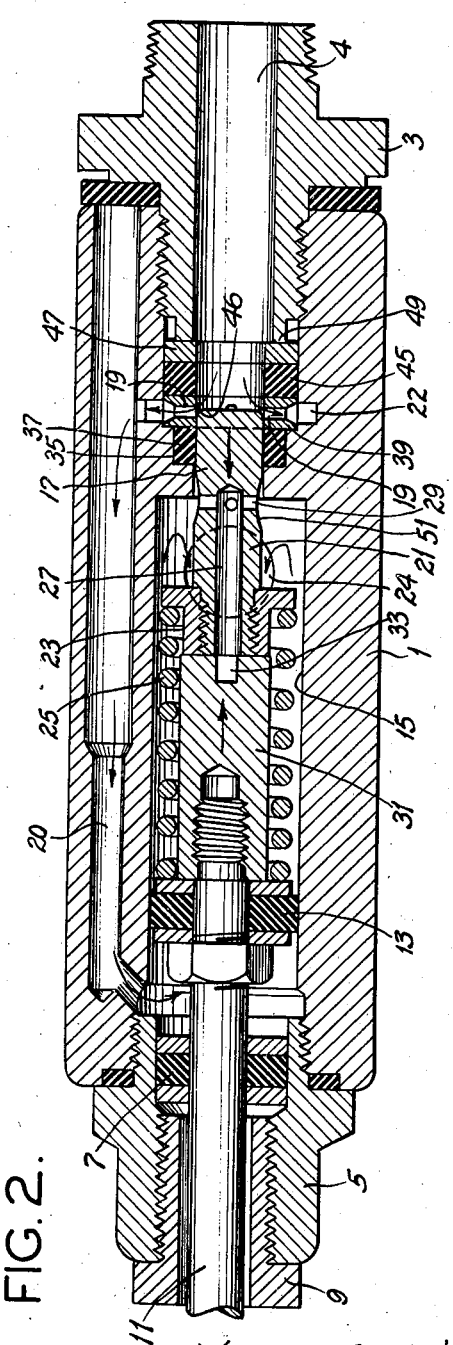
Fig. 2 is a view similar to Fig. 1, showing a subsequent position of parts in which the valve is open and the piston has moved.

An extending abutment 31 from the piston 13 having a cross passage 33 in its end is engageable with the end of the extension 21, as indicated in Fig. 2.

Operation is as follows, starting with Fig. 1:

The piston 13 is at rest in its normal position at the left end of the measuring chamber 15. The chamber 15 is filled with lubricant introduced during the previous cycle, but this lubricant is not at this time under pressure. The slide valve 17, having been pushed to the left by entering lubricant, is about to open under a relatively low pressure in port 4, of for example 800 lbs. per sq. inch. Passages 19 are about to be uncovered.

Next (Fig. 2), the slide valve 17 crosses ports 19, permitting the 800 lbs. per sq. inch pressure from port 4 to pass through the by-pass 20 behind the piston 13. This causes this piston 13 to advance to the right as shown, and to force lubricant from the measuring chamber 15 through the outlet portion 24. At this time, the spring 25 is compressed until finally the member 31 contacts the end of the extension 21, as indicated.

Since the area of the piston 13 is greater than that of the end of valve 17, the valve is then pushed toward closed position by the pressure which actuates the piston 13 (see Fig. 3). This occurs because the loads are unbalanced in the direction of closing the valve, but after the valve has closed no pressure is available to further move the piston. Thus, as is shown in Fig. 3 the piston 13 has practically completed its full stroke, and the slide valve 17 has been forced to the right, cutting off further admission of lubricant to the port 19. The piston and the slide valve remain in this Fig. 3 position until lubricant pressure in the supply port 4 is relieved.

Relief is brought about only after a pressure rise due to continued pumping action from the lubricant pressure supply. Relief occurs through a so-called pop valve (not shown). This, under the action of the spring 25, allows the valve 17 to move under low-pressure conditions from the position shown in Fig. 3 to the position shown in Fig. 4. This then places the ports 29 and waist 51 adjacent to the port 19, whereupon lubricant is transferred from behind the piston 13 through passages 20, 19, 29, 27 and to the right-hand side of the piston 13, thus reloading the measuring chamber 15. This is indicated by the arrows in Fig. 4. In Fig. 4 the piston 13 is traveling toward its Fig. 1 position, the valve 17 having finished its travel. The spring 25 operates the piston 13 at this time.

The invention per se has to do with the arrangement of packing around the ports 19, and the reduced waist around the ports 29. This consists in providing a stepped bore 35 in body 1. In the small end of this bore is a resilient packing ring 37, made for example from oil-proof synthetic rubber or the like. Around said bore 35 is the peripheral passage 22. Within this passage 22 and in the large stepped bore 35 is set a spider ring 39 in which are radial openings 19 beveled at their ends 43 as indicated (Fig. 5). This ring 39 therefore provides passages from the stepped bore 35 to the passage 22.

On the other side of the ring 39, in the large stepped bore 35, is a second and larger resilient packing ring 45 also made of oil-proof synthetic rubber or the like. This ring is held in place by metal washer 47 against which bears the end 49 of the nipple 3. There is no lapped fit for the guide ring 39 or the valve 17. The fit is simply a loose one and the sealing effect is obtained by radially compressive action from the packing rings 37 and 45.

A feature of the invention is the provision of the streamlined waist 51 around the valve 17 adjacent to the port 29. This waist places the intersection between the ports 29 and the surface of the valve in a depressed position beneath the main cylindric contour of the valve 17. Thus any burrs or the like which occur at this intersection are spaced from the packing rings 37 and 45 and avoid any possibility, during operation or assembly, of cutting these rings.

During the opening sliding operation of the valve shown in Figs. 1 and 2 the incoming pressure from the port 4 is relatively low (800 lbs. per sq. inch) since only the resistance of the spring 25 needs to be overcome in passing from the position shown in Fig. 4 to the position shown in Figs. 1 and 2. Hence the exposed packing ring 45 is at this time under pressures which do not distort it excessively during sliding of the valve. Such distortion, under valve sliding conditions, if it were to occur under high pressure would wear the packing unduly. Although the pressure rises before release, the higher pressure is applied to the packing only after the valve 17 has left it. Before the valve returns (see Figs. 3 and 4), the pressure has dropped to below 800 lbs. per sq. inch. It is not until the piston 17 is in Fig. 4 position in which it covers and protects the packing 45 that the pressure again rises.

Heretofore it was believed that a lap fit between metallic parts was absolutely necessary because of the high pressures involved in the operation of this apparatus but I have found that, since the high pressures do not occur except under conditions when the packing 45 is not being rubbed by the piston, the yielding packing may be used, provided it is mounted as disclosed herein. In addition, the streamlined waist 51 serves to avoid cutting of the packing regardless of the pressures involved. The net result is that I have obtained a packing construction which long outlasts an equivalent lap construction, according to tests. The reason for this is that in a lap construction any foreign particles in the lubricant gradually erode the lapped surfaces so that they clear too much; whereas with the resilient packing as herein used under low pressure conditions, any foreign materials tend to be embedded in the packing. A chamfer at 46 further minimizes scratching the packing 45. If the packing wears slightly, its own resilience makes up the difference in dimensions due to wear.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. In apparatus of the class described, a reciprocating piston valve having a pressure-receiving face on one end and having a hollow portion at the other end with radial ports, a body which the valve traverses, a solid ring surrounding the valve and having radial ports communicating with the ports in the valve when the valve is in one position, resilient packing means on one side of said ring and traversed by said radial valve ports during valve traverse, and resilient packing means on the other side of said ring traversed by said face.

2. In apparatus of the class described, a reciprocating piston valve having a pressure-receiving face on one end and having a hollow portion at the other end with radial valve ports, a body which the valve traverses, a metal ring surrounding the valve and having radial ports communicating with the ports in the valve when the valve is in one position, a streamlined reduced waist on the valve adjacent the ports therein, resilient packing means on one side of said ring and traversed by said waist and valve ports during valve traverse, and resilient packing means on the other side of said ring which is traversed by said face.

3. A valve construction comprising a piston having a pressure-receiving face on one end and having at least one radial port toward the other end, said piston being formed with a streamlined waist around said radial port, a cylindric form in which the piston slides comprising a rigid ring around the piston having at least one radial port, a resilient packing ring on each side of said rigid ring, one of said packing rings being traversed by said face and the other by said waist, said face also traversing the port in the rigid ring.

4. A valve construction comprising a piston having a pressure-receiving face on one end and having radial ports spaced from the face, said piston being formed with a streamlined waist adjacent said radial ports, a cylindric form in which the piston slides comprising a rigid ring around the piston having radial ports, a resilient packing ring on each side of said rigid ring, one of said packing rings being traversed by said face and the other by said waist, said face also traversing the port in the rigid ring without moving through the other packing ring.

5. A valve construction comprising a piston having a pressure-receiving face on one end and having radial ports therein spaced from said face, such piston being formed with a streamlined reduced waist adjacent said radial ports, a cylindric form in which the piston slides comprising a stepped bore, a rigid ring around the piston supported upon the step of the bore and also having radial ports, a resilient packing ring on each side of said rigid ring, one of said packing rings being in the smaller part of the stepped bore on one side of the rigid ring and being traversed by said waist, and the other resilient packing ring being located in the large part of said stepped bore on the other side of said rigid ring, said radial ports in the valve and said waist traversing the small packing ring to position the valve ports adjacent the ports in the rigid ring, and the face of the piston traversing the large packing ring to a position to open said radial ports in the rigid ring.

6. A valve construction comprising a piston having a pressure-receiving face on one end and having radial ports therein spaced from said face, such piston being formed with a streamlined reduced waist adjacent said radial ports, a cylindric form in which the piston slides comprising a stepped bore, a rigid ring around the piston supported upon the step of the bore and also having radial ports, a hollow annulus around said rigid ring, a resilient packing ring on each side of said rigid ring, means axially pressing together the rigid ring and packing rings, one of said packing rings being in the smaller part of the stepped bore on one side of the rigid ring, and being traversed by said waist, and the other resilient packing ring being located in the large part of said stepped bore on the other side of said rigid ring, said ports in the valve traversing the small packing ring to position the valve ports adjacent the ports in the rigid ring, and the face of the piston traversing only the large packing ring to a position to open said radial ports in the rigid ring substantially without substantially uncovering the small packing ring.

VICTOR G. KLEIN.